Patented Apr. 28, 1931

1,803,298

UNITED STATES PATENT OFFICE

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND

METHOD FOR THE PRODUCTION OF AMINE SALTS OF HALF ESTERS OF DICARBOXYLIC ACIDS

No Drawing.   Application filed July 17, 1929.   Serial No. 379,071.

My invention relates to a new composition of matter comprising amine salts of half esters of aryl dicarboxylic acids. These new salts are characterized by the following grouping:

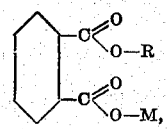

where R represents an alkyl group such as methyl, ethyl, propyl, butyl, etc., or an aryl group such as benzyl, phenyl, etc., and M represents an amine grouping, as for example, aniline, naphthylamine, methylamine, butylamine, etc.

As specific examples of my new composition of matter, the following may be cited.

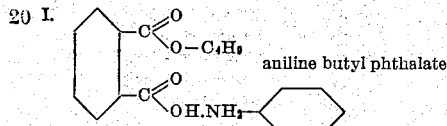
aniline butyl phthalate.

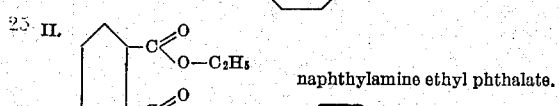
naphthylamine ethyl phthalate.

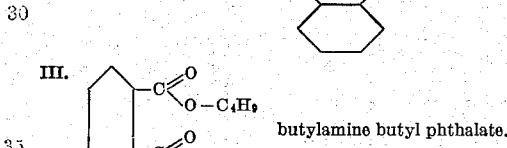
butylamine butyl phthalate.

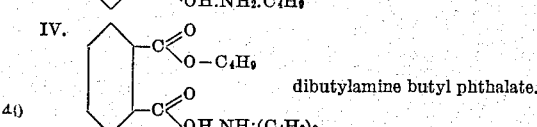
dibutylamine butyl phthalate.

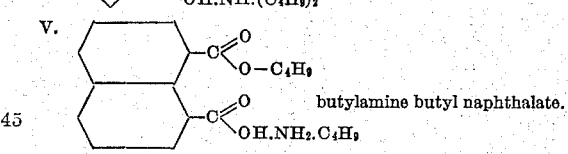
butylamine butyl naphthalate.

Compounds of the above type may be prepared by mixing the calculated amounts of a half ester of a dicarboxylic acid and an amine and then heating until a homogeneous mass results. When, for example, butylamine butyl phthalate is the desired product, it is sufficient to heat, say 430 grams of monobutyl phthalate and 145 grams of butylamine to a temperature of 50°–60° C. Naturally, with different compounds of this type there will be slight changes in both operating conditions and in yields. In the example just cited the yield is quantitative, based upon monobutyl phthalate, and about 98% based upon butylamine, a small amount of the latter being lost as vapor.

Monobutylamine butyl phthalate prepared as above described is a colorless, transparent, syrupy liquid and has the following properties: specific gravity, 1.065 at 30° C./20° C.; melting point, below —10° C.; decomposed when heated to about 150° C., water and butanol being driven off and butyl phthalimide, $C_6H_4(CO)_2NC_4H_9$, being formed. Monobutylamine butyl phthalate is soluble in methyl, ethyl, and butyl alcohols, in benzol, acetone, ether, and water, and insoluble in petroleum ether. A 5% solution of the compound in water decomposes to a slight extent (1.5%–2.0%) when boiled for two hours, butylamine being liberated to a slight extent.

Dibutylamine butyl phthalate is a solid, melting at about 20° C. and is insoluble in water. The corresponding tributylamine compound is a somewhat viscous oil, insoluble in water. Both of these compounds are stable at temperatures up to about 150° C., but above this temperature they are decomposed, butanol, water, amines, and high-boiling aromatic compounds being formed.

Now having described my invention, what I claim as new and novel is:

1. As a new composition of matter, the amine salts of half esters of aryl dicarboxylic acids.

2. As a new composition of matter, the amine salts of the alkyl half esters of aryl dicarboxylic acids.

3. As a new composition of matter, the alkyl amine salts of the alkyl half esters of aryl dicarboxylic acids.

4. As a new composition of matter, the butylamine salts of the alkyl half esters of aryl dicarboxylic acids.

5. As a new composition of matter the butylamine salts of the butyl half esters of aryl dicarboxylic acids.

6. As a new composition of matter the primary butylamine salts of the butyl half esters of aryl dicarboxylic acids.

7. As a new composition of matter, the amine salts of half esters of phthalic acid.

8. As a new composition of matter, the amine salts of the alkyl half esters of phthalic acid.

9. As a new composition of matter, the butylamine salts of the alkyl half esters of phthalic acid.

10. As a new composition of matter, the butylamine salts of the butyl half ester of phthalic acid.

11. As a new composition of matter, the primary butylamine salt of the butyl half ester of phthalic acid.

12. Method of preparing the amine salts of half esters of aryl dicarboxylic acid which comprises reacting half esters of dicarboxylic acids with amines.

In testimony whereof I affix my signature.

WILLIAM J. BANNISTER.